United States Patent [19]

Fujiwara et al.

[11] Patent Number: 4,488,159
[45] Date of Patent: Dec. 11, 1984

[54] PEN SWITCHING MECHANISM IN DRUM PLOTTERS

[75] Inventors: Mitsugu Fujiwara, Morioka; Tomio Aso, Kitakami; Koshiro Kurokawa, Hanamaki; Hideo Obara, Ezuriku, all of Japan

[73] Assignee: Alps Electric Co. Ltd, Tokyo, Japan

[21] Appl. No.: 489,936

[22] Filed: Apr. 29, 1983

[30] Foreign Application Priority Data

May 1, 1982 [JP] Japan ............................ 57-74232
May 1, 1982 [JP] Japan ............................ 57-64429[U]

[51] Int. Cl.³ ........................................ G01D 9/30
[52] U.S. Cl. .............................. 346/139 R; 346/49
[58] Field of Search .............. 346/139 R, 141, 49

[56] References Cited

U.S. PATENT DOCUMENTS

3,763,479 10/1973 Jebb ............................ 346/29 X
4,299,031 11/1981 Collins ........................ 346/141 X
4,405,931 9/1983 Fujisawa .................... 346/139 R Primary Examiner—Joseph W. Hartary
Attorney, Agent, or Firm—Guy W. Shoup; Gerard F. Dunne

[57] ABSTRACT

A drum plotter has a pen carriage movable back and forth across a sheet of print paper on a platen which is rotatable about its own axis in opposite directions. The pen carriage supports thereon a pen holder unit rotatable for bringing one of pens with differently colored inks into a writing position. The pen in the writing position is pushed by a hammer toward the platen for writing desired characters, figures or the like on the sheet of print paper. The pen holder unit is rotatably actuatable by a ratchet wheel engaged by a pawl member driven intermittently by a cam mounted on a shaft supporting the pen carriage and drivable by a solenoid-operated mechanism.

4 Claims, 15 Drawing Figures

PEN SWITCHING MECHANISM IN DRUM PLOTTERS

BACKGROUND OF THE INVENTION

The present invention relates to a drum plotter installed on a terminal device connected to a computer for drawing characters, figures, graphs and other patterns in multiple colors, and more particularly to a pen switching mechanism in such a drum plotter.

There have recently been developed plotters having a pen with water-base or oil-base ink movable back and forth across the width of a sheet of print paper or in a direction normal to the direction in which the sheet of print paper is fed along. Characters, figures and the like can be drawn on the paper by controlling the movement of the print paper and the pen in X and Y directions. To enable the plotter of this type to draw characters and figures in multiple colors, a plurality of pens with differently colored inks are supported on a rotary pen holder rotatable to move a pen with a desired color into a writing position. One known mechanism for rotating the pen holder to switch the pens has a fixed lever for pushing the pen holder to rotate the same by utilizing the force with which the pen holder is moved across the sheet of print paper. This prior mechanism however is disadvantageous in that it is time-consuming to switch the pens since the pen holder needs to be moved back to the fixed lever each time a desired pen is to be selected.

The plotter also has a hammer for pressing the pen selectively against the sheet of print paper. The hammer is driven by a solenoid fixed in a position different from a pen carriage supporting the pens and energizable to actuate the hammer through a shaft that guides the pen carriage in its movment. With this arrangement, however, the hammer actuating power is transferred through the shaft, and hence operating errors are accumulated to the point where the movement of the pens driven by the hammer cannot be adjusted easily.

The drum plotter has pens supported horizontally in confronting relation to a platen. Since there is a tendency for no ink to come out of the pens when recording is just started, it is necessary that something be drawn on the paper on a trial basis to see if the ink flows out properly. This process delays the starting of desired recording, and produces a useless length of print paper.

SUMMARY OF THE INVENTION

It is a first object of the present invention to provide a drum plotter which will eliminate the foregoing prior problems and reduces the time required for switching pens by immediately rotating a pen holder no matter where a pen carriage installing the pen holder thereon may be positioned.

A second object of the present invention is to provide a drum plotter having a hammer for pushing pens with a minimum of operating error achieved by shortening the path along which actuating power is transmitted from a solenoid to the hammer.

A third object of the present invention is to provide a drum plotter in which ink is allowed to flow easily out of pens at all times to permit recording operation to be started smoothly and to make trial recording unnecessary.

According to the present invention, a pen switching mechanism in a drum printer, comprises a platen rotatable about its own axis in one and opposite directions, a shaft extending parallel to the platen, and a pen carriage movably mounted on the shaft in confronting relation to the platen, the pen carriage being movable along the shaft in axial directions of the platen. The pen carriage has a pen holder unit supporting a plurality of pens for rotatable movement to bring one of the pens at a time into a writing position, a hammer for selectively pressing the pen in the writing position toward the platen, a ratchet wheel for rotation with the pen holder and a pawl member movably mounted on the pen carriage and operatively engaging teeth of the ratchet wheel for rotating the latter. A mechanism is coupled with the shaft for angularly moving the latter about its own axis, and has a cam held in engagement with the pawl member for actuating the latter.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
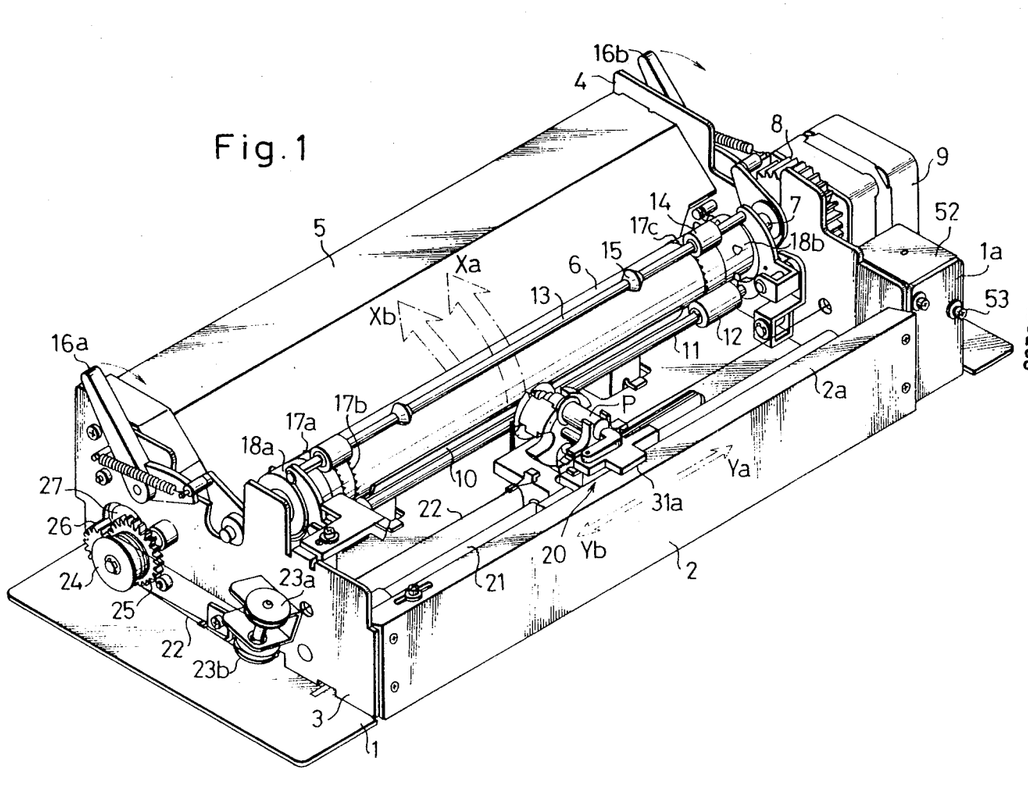
FIG. 1 is a perspective view of a drum plotter constructed according to the present invention.

FIG. 1 shows the overall construction, in perspective, of a drum plotter. The construction and operation of the drum plotter shown in FIG. 1 will first be described.

Figure 4:
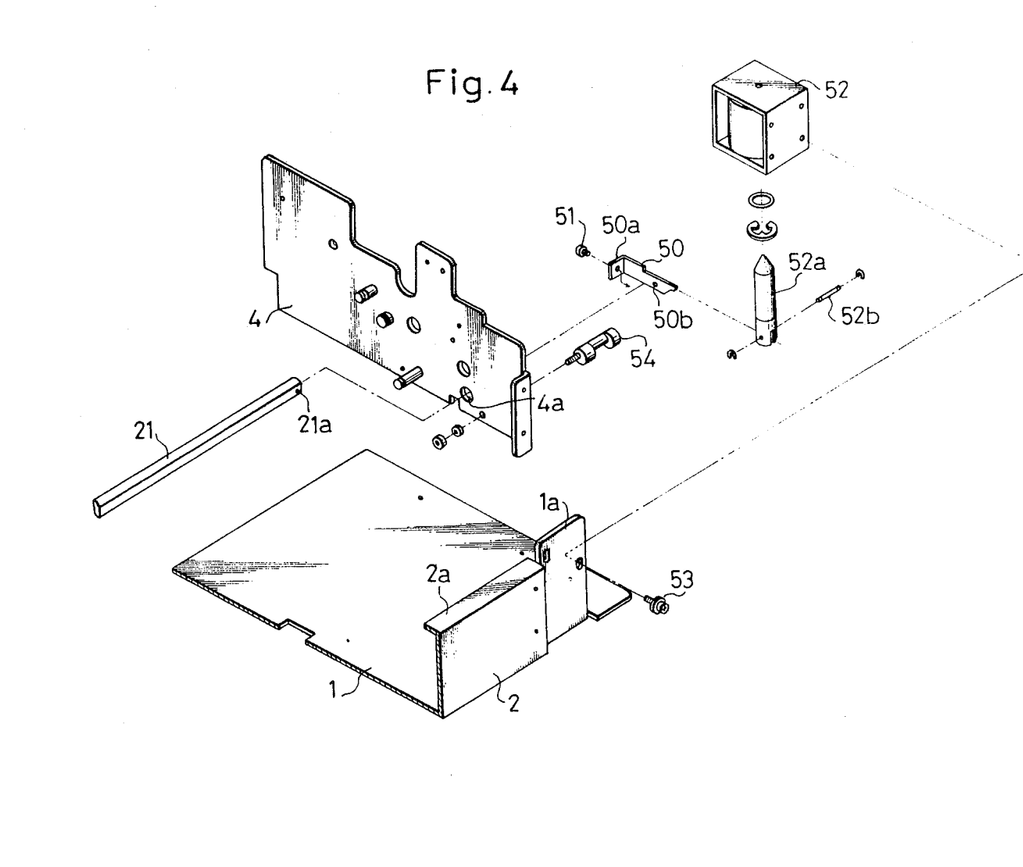
FIG. 4 is an exploded perspective view of a structure supporting an end of a shaft constituting a pen switching mechanism.

The drum plotter has a base 1 including a front plate 2 extending upwardly from a front edge of the base 1, the front plate 2 being a right-angularly bent extension of the base 1 as shown in FIG. 4. Left-hand and right-hand side plates 3, 4 are secured to lateral ends of the base 1. A guide plate 5 is disposed above a rear edge of the base 1 and extending between the side plates 3, 4.

A platen 6 is rotatably supported on upper central portions of the side plates 3, 4. The platen 6 has a shaft 7 having a right-hand end projecting outwardly beyond the right-hand side plate 4 and having a gear 8 secured thereto at a distal end thereof. A stepper motor 9 is placed outwardly of the right-hand side plate 4 and has a pinion (not shown) secured to the shaft of the motor and meshing with the gear 8. The platen 6 is rotatable about its own axis in both directions in response to normal and reverse rotation of the stepper motor 9. A sheet of print paper is supplied over the guide plate 5 into a position below the platen 6 and along a curved guide plate 10 underlying the platen 6, and is fed out in the direction of the arrow Xa. The sheet of print paper is pressed against the platen 6 by rollers 12 rotatably mounted on ends of a lower shaft 11 and rollers 14 rotatably mounted on ends of an upper shaft 13, the lower and upper shafts 11, 13 extending axially along and in confronting relation to the platen 6. A pair of paper presser rollers 15 in the shape of abacus beads is rotatably mounted on the upper shaft 13 inwardly of the rollers 14. The sheet of print paper is rolled around a front surface portion of the platen 6 by these rollers, 12, 14, 15, and is fed out in the directions of the arrows Xa, Xb by rotating the stepper motor 9 in normal and reverse directions.

Levers 16a, 16b are pivotably mounted on the left-hand and right-hand side frames 3, 4, respectively, on their outer sides. The levers 16a, 16b are operatively connected to the shafts 11, 13 via a mechanism such that when the levers 16a, 16b are pulled in the direction of the arrows, the rollers 12, 14, 15 are moved out of contact with the platen 6, allowing the sheet of print paper to be loaded into the drum printer around the platen 6. The platen 6 has on one end thereof two rows of metal teeth 17a, 17b and on the other end one row of metal teeth 17c, the teeth 17a, 17b, 17c extending peripherally around the platen 6. When the sheet of print paper is wound around the platen 6, the side edges of the paper are firmly retained in place by the teeth 17a, 17b, 17c. Accordingly, there is no danger for the sheet of print paper to slip on the platen 6 and the sheet of print paper can reliably be fed out in the directions of the arrows Xa, Xb. Sprockets 18a, 18b are mounted on the platen 6 for corotation and located axially outwardly of the teeth 17a, 17b and 17c, respectively. Where the sheet of print paper has feed holes along lateral edges, the sprockets 18a, 18b engage in the feed holes for positive feeding of the sheet of print paper without any slippage on the platen 6.

A pen carriage 20 is positioned in front of the platen 6. The pen carriage 20 is movable along a shaft 21 extending between the left-hand and right-hand side plates 3, 4 while being guided by a guide member 2a bend from an upper edge of the front plate 2 for back-and-forth movement in the direction of the arrows Ya, Yb. The pen carriage 20 is driven to move back and forth by a wire 22 having ends fastened to side edges of the pen carriage 20. The wire 22 is trained around upper and lower pulleys 23a, 23b and a drive pulley 24 which are mounted on the left-hand side plate 3 at its outer surface, and also around pulleys (not shown) similar to the pulleys 23a, 23b and mounted on the right-hand side plate 4 at its outer surface. A gear 25 is integrally formed with the drive pulley 24 and held in mesh with a pinion 26 secured to the rotatable shaft of a stepper motor 27 (only partly shown in FIG. 1) disposed below the guide plate 5. When the stepper motor 27 is driven to rotate in normal and reverse directions, the drive pulley 24 is rotated to cause the wire 22 to pull 20 back and forth in the directions of the arrows Ya, Yb. The pen carriage 20 support four pens P storing oil-base or water-base inks of different colors (only one pen shown in FIG. 1). Any one of the pens P with ink of a desired color can be brought to an uppermost position on the pen carriage 20 by a pen switching mechanism (described later on).

For recording operation, the stepper motor 9 is rotated in normal and reverse directions to feed the sheet of print paper around the platen 6 in the directions of the arrows Xa, Xb. At the same time, the stepper motor 27 is rotated in normal and reverse directions to move the pen carriage 20 back and forth in the directions of the arrows Ya, Yb. A desired pen P is pressed against the sheet of print paper to draw characters, figures or the like on the sheet of print paper.

The pen carriage 20 will be described in more detail with reference to FIGS. 2, 3 and 4.

The pen carriage 20 has a carriage base 31 with a sleeve 32 mounted therebelow and fitted slidably over the shaft 21 for allowing the carriage base 31 to move in the directions of the arrows Ya, Yb. The carriage base 31 has a slit 31a formed in a front portion thereof. While the carriage base 31 moves in the directions of the arrows Ya, Yb, the guide member 2a of the front plate 2 is inserted in the slit 31a in sliding relationship, as shown in FIG. 1. With the guide member 2a inserted in the slit 31a, the carriage base 31 is prevented from turning around the shaft 21 so that the pens 6 mounted on the carriage base 31 are directed at an angle (horizontally in the illustrated embodiment) to the platen 6.

A shaft 33 is mounted on the carriage base 31. The shaft 33 has one end supported in a support hole 31b (shown by the broken line in FIG. 3) defined in the carriage base 31 and the other end supported by a support plate 35 through a sleeve 34. The support plate 35 has a lower end fastened by screws 36 to an end face 31c of the carriage base 31. The shaft 33 has opposite end portions 33a, 33b substantially ovel in cross-sectional shape. A pen holder 37 is mounted on the end portion 33a, while a pen holder 38 is mounted on the end portion 33b. Therefore, the pen holders 37, 38 are rotatable in unison with the shaft 33. The pen holder 37 has four angularly equidistant slots 37a, 37b, 37c and 37d defined in its outer peripheral edge, and likewise the pen holder 38 has four angularly equidistant slots 38a, 38b, 38c and 38d defined in its outer peripheral edge. The slots 37a and 38a, 37b and 38b, 37c and 38c, 37d and 38d are positioned in axial alignment with each other. The paired pen holders 37, 38, jointly support the four pens P with inks of different colors such as red, blue, black and green.

A pen switching mechanism for selecting the pens P and bringing the selected pen P into a writing position will now be described.

Figure 5A:
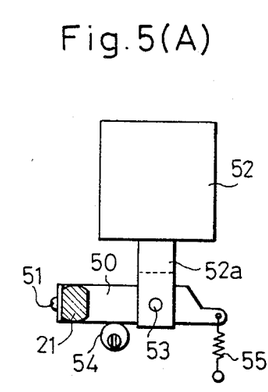
FIG. 5(A) is a side elevational view of a solenoid in the pen switching mechanism, the view showing the parts position when the solenoid is de-energized.
Figure 5B:
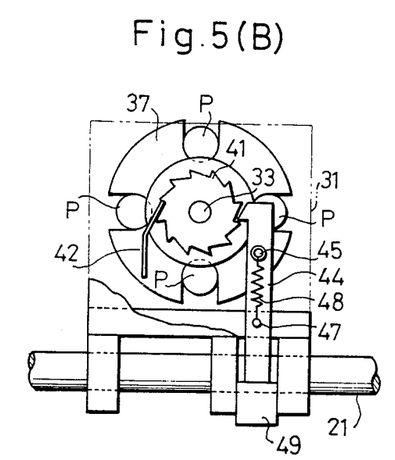
FIG. 5(B) is a rear elevational view of the pen switching mechanism having a ratchet wheel and a pawl plate as they are positioned when the solenoid is de-energized.

A ratchet wheel 41 is mounted on the end portion 33a of the shaft 33, the ratchet wheel 41 being movable with the pen holders 37, 38 through the shaft 33. A stopper 42 is pressed against one tooth at a time of the ratchet wheel 41 (FIG. 5(B)). The stopper 42 comprises a leaf spring secured by a screw 43 threaded into a tapped hole 31d in the carriage base 31. The stopper 42 allows the ratchet wheel 41, the shaft 33 and the pen holders 37, 38 to rotate clockwise as shown in FIG. 5(B) while preventing them from rotating counterclockwise. A pawl plate 44 is disposed in diametrically opposite relation to the stopper 42 across the ratchet wheel 41 and engages one of the teeth of the ratchet wheel 41 at a time. The pawl plate 44 has a pair of tapped holes 44a, 44b in which there is threaded a pair of externally threaded pins 45, 46, respectively, extending through oblong holes 31e, 31f defined in the carriage base 31. The pawl plate 44 is thus slidably movable vertically along the oblong holes 31e, 31f. A spring 48 is connected between a pin 47 affixed to the carriage base 31 and the pin 45 for normally biasing the pawl plate 44 downwardly as shown.

A cam 49 is disposed below the carriage base 31 and has a hole 49a of a substantially oval shape. The shaft 21 extending through the sleeve 32 beneath the carriage base 31 also extends through the hole 49a. The shaft 21 is also substantially oval in cross-sectional shape. Therefore, the cam 49 is angularly movable in unison with the shaft 21. The cam 49 has a distal end 49b held in abutment against a lower end face of the pawl plate 44.

Figure 6A:
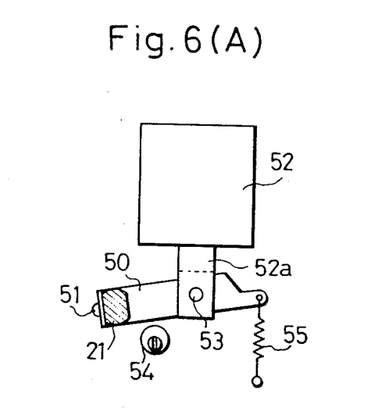
FIGS. 6(A), 6(B) and 6(C) are views similar to FIGS. 5(A), 5(B) and 5(C), respectively, showing the parts positioned when the solenoid is energized.

As shown in FIG. 4, the shaft 21 has a right-hand end projecting outwardly through a hole 4a in the righthand side plate 4. A lever 50 is attached to the projecting end of the shaft 21 and has a bent portion 50a held against a side surface of the right-hand end of the shaft 21 and fastened thereto by an attachment screw 51 threaded into a tapped hole 21a in the shaft 21. The base 1 has a front solenoid-attachment plate 1a positioned at the right-hand side plate 4, the plate 1a being an upward bent extension of the base 1. A solenoid 52 is mounted on the solenoid-attachment plate 1a by attachment screws 53. The solenoid 51 has a downward plunger 52a having a lower end coupled to the lever 50 by a pin 52b extending through a support aperture 50b in the lever 50. An eccentric stopper 54 is mounted on the right-hand side plate 4 at its outer surface. The lever 50 has a lower edge held in abutment against the eccentric stopper 54. As illustrated in FIGS. 5(A) and 6(A), a spring 55 is connected between the distal end of the lever 50 and the base for normally urging the lever 50 into abutting engagement with the eccentric stopper 54.

Figure 5C:
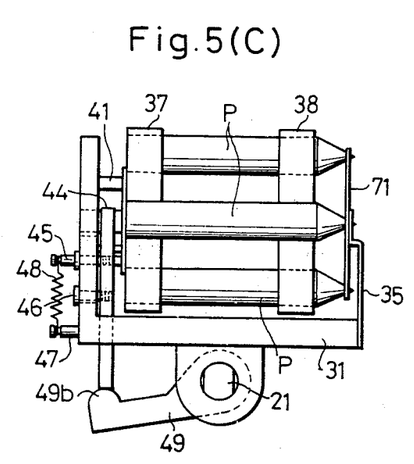
FIG. 5(C) is a right-hand side elevational view of the pen switching mechanism.

FIGS. 5(A) through 5(C) show the position of the parts assumed when the solenoid 52 is de-energized. In this position, the lever 50 is held against the eccentric stopper 54 under the bias of the spring 55. The shaft 21 is not turned about its own axis, and the distal end of the cam 49 mounted on the shaft 21 is in a lowered position as shown in FIG. 5(C) with the pawl plate 44 lowered under the force of the spring 48. The positional relationship between the pawl plate 44 and the ratchet wheel 41 at this time is shown in FIG. 5(B).

Figure 6B:
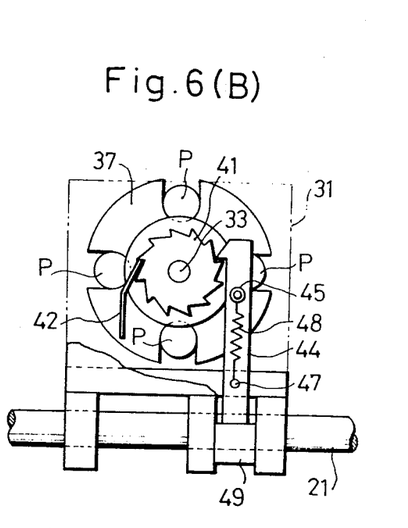
Figure 6C:
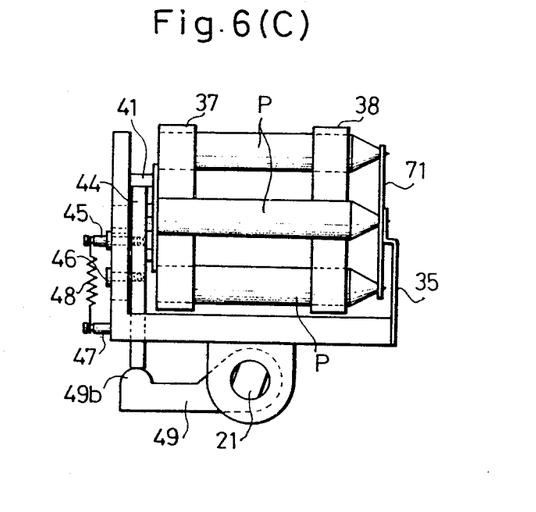

FIGS. 6(A) through 6(C) illustrate the parts position in which the solenoid 52 is energized. The solenoid plunger 52a is pulled upwardly to turn the shaft 21 counterclockwise as shown in FIG. 6(A) through a predetermined angle. The cam 49 also turns with the shaft 21 to cause the distal end 49b to push the pawl plate 44 upwardly to the position of FIG. 6(B). When the solenoid 52 is de-energized at this time, the lever 50 and the shaft 21 are brought to the position of FIG. 5(A) under the resiliency of the spring 55, and the pawl plate 44 is moved downwardly to the position of FIG. 5(B) under the biasing force of the spring 48. By intermittently energizing the solenoid 52, the pawl plate 44 turns the ratchet wheel 41 clockwise about its own axis. The pen holders 37, 38 and the pens P supported thereby are also angularly moved about the shaft 33 in an intermittent steplike manner.

Figures 2, 3:
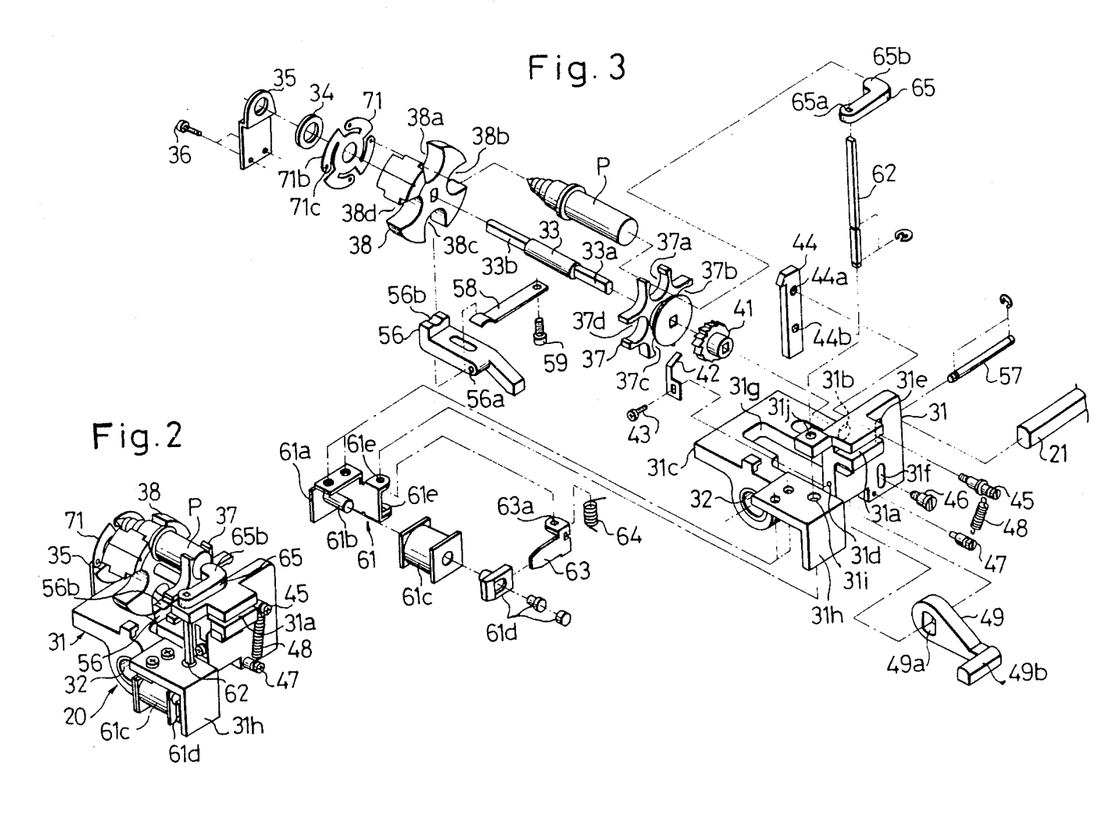
FIG. 2 is a perspective view of an assembled pen carriage.
FIG. 3 is an exploded perspective view of the pen carriage shown in FIG. 2.

As shown in FIG. 3, the carriage base 31 has a central slot 31g in which a stabilizing stopper 56 is mounted. The stabilizing stopper 56 has a support hole 56a through which extends a support pin 57 inserted through the carriage base 31. Therefore, the stabilizing stopper 56 is angularly movable about the support pin 57. A leaf spring 58 is fixed by a screw 59 to the underside of the carriage base 31 and normally urges the stabilizing stopper 56 upwardly. When one of the four pens P supported by the pen holders 37, 38 is brought to a lowermost position while the solenoid 52 is being intermittently energized, a central lower surface of the pen P in the lowermost position is fitted in an upper recess 56b in the stabilizing stopper 56 to allow the pen P to be positionally stabilized in the lowermost position. Accordingly, the pen holders 37, 38 are stabilized in the position in which the pens P are located in four positions, that is, upper, lower and two lateral positions (FIGS. 5(B) and 5(C)). The uppermost one of the four pens P serves to write any desired characters, figures or the like on the sheet of print paper wound around the platen 6.

A hammer drive mechanism for pressing the uppermost pen P against the sheet of print paper on the platen 6 will now be described.

The hammer drive mechanism is mounted on the pen carriage 20 for movement therewith in the directions of the arrows Ya, Yb (FIG. 1).

The hammer drive mechanism has a solenoid 61 serving as a drive source located below the carriage base 31 on its left-hand side. The carriage base 31 has an integral L-shaped solenoid attachment 31h on its left-hand side with a holder 61a made of a metal sheet screwed to the underside of the solenoid attachment 31h. A fixed iron core 61b is secured to the holder 61a and supports a coil bobbin 61c mounted thereon. A movable iron core 61d is positioned in front of the coil bobbin 61c and retained between the latter and the solenoid attachment 31h against dropping off the position therebetween. The movable iron core 61d can be attracted toward the fixed iron core 61b in response to energization of the coil bobbin 61c. The holder 61a has support holes 61e in its right-hand tabs with a shaft 62 (FIG. 3) inserted through the support holes 61e. The shaft 62 also extends through support holes 31i, 31j defined in the carriage base 31. The shaft 62 is substantially oval in cross section, and has a lower end fitted in a substantially oval hole 63a in an actuator 63 mounted laterally on the holder 61a. Therefore, the actuator 63 is angularly movable with the shaft 62. The actuator 63 is movable with the movable iron core 61d toward and away from the coil bobbin 61c, and is normally urged by a return spring 64 in a direction to move away from the coil bobbin 61c. A hammer 65 is mounted on the shaft 62 at its upper end. The hammer 65 has a substantially oval hole 65a in which the upper end of the shaft 62 is fitted for allowing the hammer 65 and the shaft 62 to move together. The hammer 65 also has a projection 65b held in abutting engagement with a rear end of the pen P as brought to the uppermost writing position.

Figure 7:
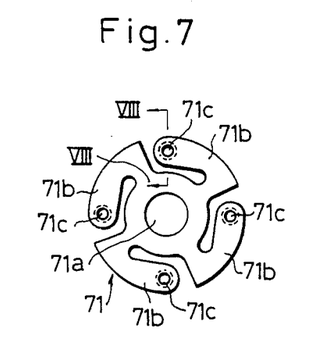
FIG. 7 is a front elevational view of a pen return spring.
Figure 8:
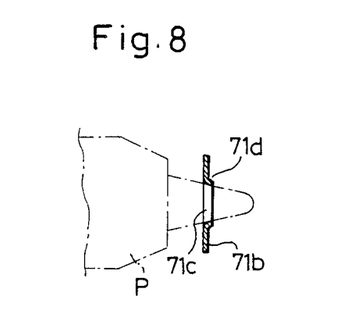
FIG. 8 is an enlarged cross-sectional view taken along line VII—VII of FIG. 7.

Between the pen holder 38 and the sleeve 34, there is disposed a pen return spring 71 (better shown in FIGS. 7 and 8) made of a sheet of phosphor bronz or springy material by pressing. The pen return spring 71 has a central attachment hole 71a fitted over the shaft 33. The pen return spring 71 is also provided with four arms 71b disposed angularly equidistant relationship and extending circumferentially around the central hole 71a, each arm having a support hole 71c in its distal end. As illustrated in FIG. 8, each arm has an integral flange 71d extending around the support hole 71c and directed toward the platen 6. The pens P have tip ends inserted and supported in the support holes 71c, respectively. The pens P are normally urged away from the platen 6 under the resilient force from the arms 71b of the pen return spring 71.

Figure 9:
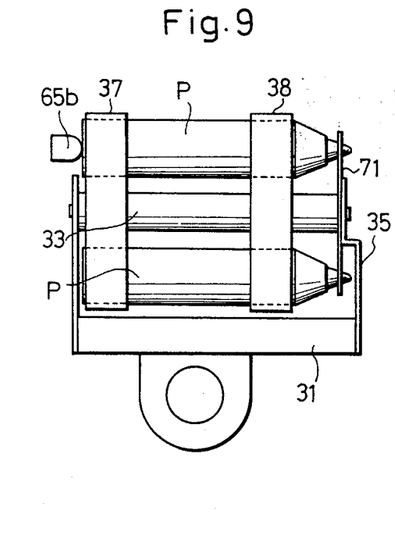
FIG. 9 is a right-hand side elevational view of a pen holder which is in a non-writing position.
Figure 10:
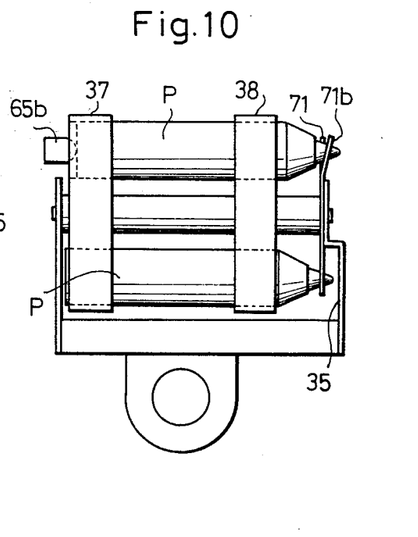
FIG. 10 is a right-hand side elevational view of the pen holder which is in a writing position.

When the solenoid 61 remains de-energized, the movable iron core 61d and the actuator 63 are biased by the spring 64 to move away from the coil bobbin 61c. The hammer 65 coupled through the shaft 62 to the actuator 63 is angularly moved in the same direction as that of turning movement of the actuator 63. The projection 65b of the hammer 65 pushes the rear end of the uppermost one of the four pens P, forcing the distal end of the pen P against the sheet of print paper on the platen 6 so as to be ready for writing characters, figures or the like as shown in FIG. 10. When the solenoid 61 is energized, the movable iron core 61d is attracted to the fixed iron core 61b to turn the actuator 63 toward the coil bobbin 61c. The hammer 65 is turned with the actuator 63, releasing the pen P which is pushed back under the resiliency of the arm 71b of the pen return spring 71 until the tip end of the pen P is spaced from the sheet of print paper. In this position, no characters, figures or the like are written on the sheet of print paper (FIG. 9).

Overall operation of the pen carriage 20 of the foregoing construction will be described with reference to operation of the drum plotter.

The sheet of print paper extending around the platen 6 is fed back and forth in the directions of the arrows Xa, Xb (FIG. 1) on normal and reverse rotation of the stepper motor 9. The pen carriage 20 is moved back and forth in the directions of the arrows Ya, Yb by the wire 22 trained around the drive pulley 24 driven by the stepper motor 27.

During such movements of the sheet of print paper and the pen carriage 20, the solenoid 61 in the hammer drive mechanism is de-energized to allow the hammer 65 to push the uppermost one of the four pens P supported by the pen holders 37, 38 until the tip end of the uppermost pen P is pressed against the sheet of print paper. At this time, a character or figure or both can be drawn on the sheet of print paper in response to controlled movements of the sheet of print paper and the pen carriage 20 in the directions of the arrows Xa, Xb and Ya, Yb. When the solenoid 61 is energized, the hammer 65 is retracted to permit the pen P to be spaced from the sheet of print paper, thus interrupting writing operation on the latter. To change colors of characters or figures to be written on the sheet of print paper, the solenoid 52 (on the right-hand side plate 4) in the pen switching mechanism is repeatedly energized and de-energized. The shaft 21 is reciprocably turned about its own axis by the lever 50 to enable the cam 49 below the carriage base 31 to lift the pawl plate 44 in several successive strokes. The pawl plate 44 then causes the ratchet wheel 41 to rotate about its own axis and hence the pen holders 37, 38 to rotate therewith. When the pen P with a desired ink color is elevated to the uppermost position, the solenoid 52 is inactivated. Thereafter, the sheet of print paper is moved in the directions of the arrows Xa, Xb and the pen carriage 20 is moved in the directions of the arrows Ya, Yb while the pen P is pressed against the sheet of print paper by the hammer 65, thereby writing characters, figures or the like in the selected color.

While in the illustrated embodiment the plunger solenoid 52 and the lever 50 have been described as a mechanism for angularly moving the shaft 21 through a given angle, other rotational drive mechanisms such as a rotary solenoid and a stepper motor may be employed for turning the shaft 21 about its own axis. The pen holders 37, 38 may be arranged to support three, five or more pens P with different ink colors.

Figure 11:
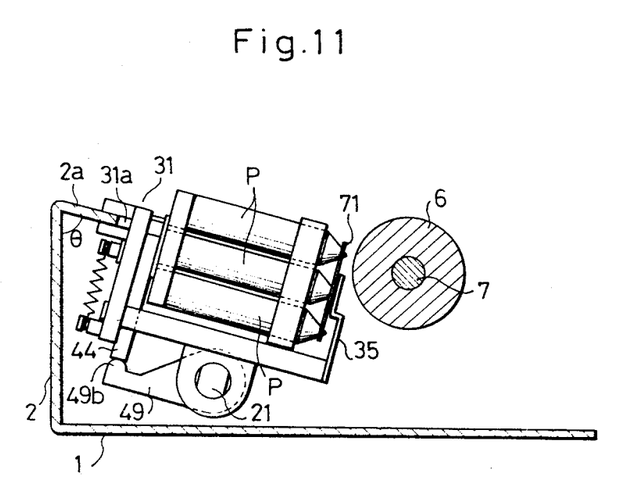
FIG. 11 is a right-hand side elevational view of a pen holder mechanism as directed at an angle to a platen.

Furthermore, the pens P supported by the pen carriage 20 may be tilted as shown in FIG. 11 so that the tip ends of the pens P are directed obliquely downwardly for abutment against a sheet of print paper on the platen 6.

Although a certain preferred embodiment has been shown and described, it should be understood that many changes and modifications may be made therein without departing from the scope of the appended claims.

What is claimed is:

1. A pen switching mechanism in a drum printer, comprising:
   (a) a platen rotatable about its own axis in one and opposite directions;
   (b) a shaft extending parallel to said platen;
   (c) a pen carriage movably mounted on said shaft in confronting relation to said platen, said pen carriage being movable along said shaft in axial directions of said platen;
   (d) a pen holder unit mounted on said pen carriage and supporting a plurality of pens for rotatable movement to bring one of said pens at a time into a writing position;
   (e) a hammer operatively mounted on said pen carriage for selectively pressing the pen in said writing position toward said platen;
   (f) a ratchet wheel rotatably mounted on said pen carriage for rotation with said pen holder;
   (g) a pawl member movably mounted on said pen carriage and operatively engaging teeth of said ratchet wheel for rotating the latter; and
   (h) a mechanism coupled with said shaft for angularly moving the latter about its own axis, and having a cam held in engagement with said pawl member for actuating the latter.

2. A pen switching mechanism according to claim 1, including means on said pen carriage for driving said hammer to press the pen in said writing position.

3. A pen switching mechanism according to claim 2, wherein said means comprises a solenoid-operated mechanism.

4. A pen switching mechanism according to claim 1, wherein said pens have tip ends tilted downwardly for abutment against said platen.

* * * * *